Patented Jan. 5, 1943

2,307,552

UNITED STATES PATENT OFFICE 2,307,552

CONTROLLED HYDROHALOGENATION OF UNSATURATED ORGANIC COMPOUNDS

William E. Vaughan and Frederick F. Rust, Berkeley, Calif., assignors to Shell Development Company, San Francisco, Calif., a corporation of Delaware No Drawing. Application October 30, 1940, Serial No. 363,486

10 Claims. (Cl. 204—163)

The present invention relates to a process of reacting hydrogen halides with unsaturated organic compounds, and more particularly pertains to a method for controlling the reaction between hydrogen halides and unsymmetrical organic compounds containing at least one olefinic or acetylenic linkage, to produce addition products of a predetermined character.

It is well known that hydrogen halides may be added to unsaturated hydrocarbons and to various unsaturated derivatives of such hydrocarbons. In fact, as far back as 1870, Markownikoff stated that "if an unsymmetrical hydrocarbon combines with a halogen acid, the halogen adds to the carbon atom with fewer hydrogen atoms, i. e. to the carbon atom which is more under the influence of the other carbon atoms." The same investigator further stated that, in the addition of a hydrogen halide to vinyl chloride, chlorinated propylene, etc (i. e. to unsaturated hydrocarbons wherein one of the unsaturated carbon atoms carries a halogen atom, or wherein these unsaturated carbon atoms contain dissimilar numbers of such halogen atoms directly attached thereto), the hydrogen atom of the hydrogen halide will add to the unsaturated carbon which is already combined with the greater number of halogen atoms. The hydrogen atom of the hydrogen halide molecule attaches to the adjacent unsaturated carbon atom. The above type of hydrohalogenation is termed "normal" is distinguished from the "abnormal" addition of the hydrogen halide, this abnormal addition being one in which the hydrogen and halogen atoms are added in positions which are interchanged with respect to addition according to the above-defined Markownikoff rule.

Various methods for controlling the direction of the hydrohalogenation reaction have been previously proposed. For example, the Kharasch patent—U. S.—2,058,466 discloses a process wherein hydrogen halides are caused to react, via "abnormal" addition, with olefinic hydrocarbons or halo-substituted olefinic hydrocarbons by effecting the reaction in the liquid phase and in the deliberate presence of peroxides, such as benzoyl peroxide, acetyl peroxide, hydrogen peroxide, ascaridole, turpentine peroxide, etc., as well as of air, ozone or oxygen, all of which tend to form peroxides. Also, the Kharasch patent—U. S.—2,058,465, provides for a process of normal addition of hydrogen halides to the aforementioned class of olefinic hydrocarbons, such addition being assured by effecting the reaction in the presence of anti-oxidants, such as hydroquinone, catechol, pyrogallol, diphenylamine, phenylnaphthylamine, and the like, which will inhibit the tendency of abnormal reactions caused by peroxides which may be present in the liquid reaction mixture.

It has now been discovered that unsaturated organic compounds of the class more fully described hereinbelow may be reacted with hydrogen halides to effect directional hydrohalogenation via the abnormal addition, i. e. contrary to the Markownikoff rule, in the absence of free oxygen, ozone, air or peroxides. In fact, the abnormal addition of the hydrogen halide according to the present invention may be effected in the absence of any compound the presence of which was heretofore considered essential for promoting or catalyzing the aforementioned abnormal hydrohalogenation of unsaturated organic compounds.

Broadly stated, the present invention resides in a photo-chemical process of effecting the hydrohalogenation reaction under the deliberate influence of ultra-violet radiation, and more particularly under the influence of light rays having a wave-length of below about 2900 to 3000 A. U. (Angstrom units). It has been still further discovered that these light rays strongly catalyze the photo-chemical abnormal addition of hydrogen halides, while, at the same time, the addition of such hydrogen halides in accordance with the Markownikoff rule is substantially if not completely avoided, thereby resulting in the uniform production of halogenated derivatives of a predetermined character.

Although all unsaturated organic compounds may be reacted with a hydrogen halide under the influence of ultra-violet radiation to produce reaction products wherein the hydrogen halide is added to the unsaturated compound, certain of these unsaturated organic compounds, due to their symmetry, can produce only one halogenated derivative. For example, when hydrogen bromide is added to butene-2, only one product can result, namely 2-bromobutane. The same is true in the case of the hydrohalogenation of all unsaturated compounds in which the unsaturated linkage, whether it is an olefinic bond or an acetylenic bond, divides the organic compound into two identical radicals. Therefore, in order to be able to evidence directional hydrohalogenation, the unsaturated organic compound must be such that the unsaturated linkage divides the compound into two dissimilar groups. However, there is no intention of limiting the present invention solely to the treatment of organic compounds such as hydrocarbons in which the unsaturated linkage is in asymmetrical position with respect to the carbon atoms of the chain, it being well understood that unsaturated hydrocarbons which contain an unsaturated linkage in symmetrical position with respect to the carbon atoms, may still be directionally hydrohalogenated if the two radicals of such unsaturated hydrocarbons contain different substituents. Examples of this class of compounds are 2-chlor-butene-2, 1-chlor-butene-2, and the like. These compounds, although containing an olefinic bond which is in symmetrical position with respect to the carbon atoms of the chain, may nevertheless be directionally hydrohalogenated because of the presence of a substituent, e. g. halogen atom, on one of the radicals connected by the double bond.

The following is a non-limiting, representative list of the defined class of unsaturated organic compounds which may be directionally hydrohalogenated according to the process of the invention:

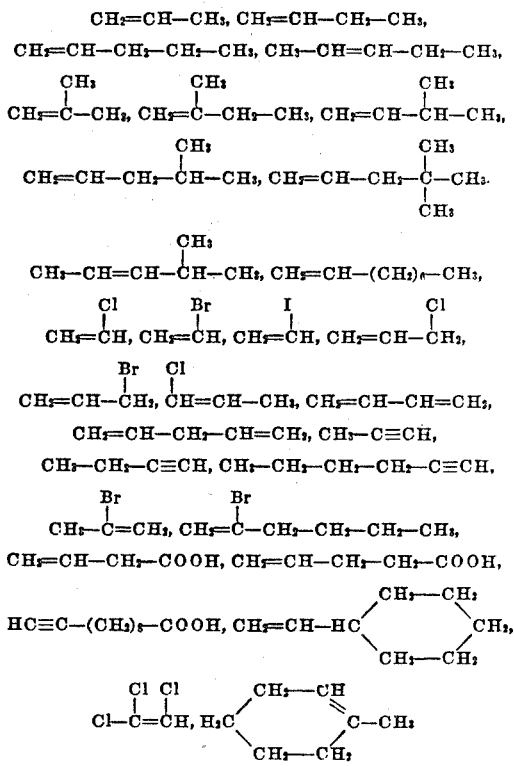

and the like, and their homologues and analogues, as well as suitable substitution products.

A particularly suitable group of organic compounds which may be directionally hydrohalogenated via abnormal addition comprises the compounds in which the unsaturated linkage is in terminal or alpha position. Also, aliphatic hydrocarbons and their halo-substituted derivatives containing unsaturated linkages both in alpha and omega positions (i. e. in terminal positions) may be readily hydrohalogenated according to the process of the present invention to yield products in which both terminal carbon atoms contain halogens attached thereto. Another group of organic compounds which may be employed as the primary material comprises or includes organic compounds wherein an olefinic linkage is in non-terminal position and is between two carbon atoms having a dissimilar number of hydrogen atoms attached to each of said unsaturated carbon atoms due to various substituents attached thereto. For instance, the double bond may be between two carbon atoms which are of secondary and tertiary character, respectively. Another example is a compound in which the unsaturated carbon atoms are both primary or both secondary, but have unequal numbers of halogens directly attached to them.

The hydrohalogenation of the above-defined class of unsaturated organic compounds under the influence of ultra-violet radiation may be effected in the vapor or liquid phase, or in a two-phase liquid-vapor system. Since the abnormal addition of the hydrogen halides according to the present process occurs photo-chemically, no heating is necessary. In fact, in many instances the reaction, although it may be realized at temperatures of about 25° C. is preferably effected at temperatures which are even below 0° C. Also, it was discovered that the abnormal addition of hydrogen halides, when the reaction is effected under the influence of ultra-violet radiations, proceeds regardless of the presence or absence of a liquid film in the reaction zone.

Although the reaction described herein may be promoted by using the whole range of ultra-violet radiation, the most effective wave lengths of light which promote the desired abnormal hydrohalogenation appear to lie in that portion of the spectrum which is below about 3200 Angstrom units, and more particularly in the approximate neighborhood of 2900 Angstrom units. As will be brought out in the examples presented hereinafter, the interposing of an ordinary window glass filter (which has a lower limit of transmission of about 3300 A. U.) or of a Pyrex glass filter having a lower transmission limit of about 2900 to 3000 A. U., in the path of light coming from a source emitting ultraviolet radiations, will cause a substantially complete inhibition of the reaction. On the other hand, the use of quartz vessels for the reaction according to the present invention allows efficient abnormal hydrohalogenation due to the fact that quartz transmits ultra-violet rays considerably below 3000 Angstrom units.

When the hydrohalogenation with ultra-violet rays is effected photo-chemically according to this invention, there is frequently an initial induction period during which no or substantially no reaction occurs. The length of this induction period varies depending on a number of conditions, such as the specific reactants employed, their concentration in the reaction zone, intensity of the effective wave lengths, presence or absence of impurities and/or added surfaces in the reaction zone, etc. Also, other conditions being equal, a change in the intensity of the effective wave lengths of the ultra-violet radiation will vary the rate and degree of abnormal hydrohalogenation, and may, in some instances, result in the formation of a mixture of reaction products resulting both from the normal and abnormal additions of hydrogen halides to the unsaturated organic compound subjected to the treatment.

The abnormal hydrohalogenation may be effected in a batch, intermittent or continuous manner. When effected by a batch method, the reactants may be conveyed under any desirable or optimum pressure and temperature into a suitable container which is then illuminated with ultra-violet light for a period of time sufficient to effect the hydrohalogenation reaction. Since ordinary glass or Pyrex glass will not permit the substantial transmission of the effective light waves, namely those in the neighborhood of 2900 to 3000 Angstrom units and below, it is prefrable to construct the container of quartz, or, at least, to provide such container with an opening or window of quartz, through which the interior may be illuminated with ultra-violet rays.

The invention will be illustrated by the following specific examples, it being understood that there is no intention to be limited by any details hereof, since many variations may be made within the scope of the appended claims.

*Example I*

Pure isobutylene, which was carefully fractionated to separate it from other gases, was introduced into a 3-liter bulb which was first subjected to a high vacuum to remove substantially all of the gases therefrom. The isobutylene gas was introduced until the pressure in the bulb was equal to 199.7 mm. of mercury pressure. Thereafter, hydrogen bromide gas was introduced into the same container for an additional 201.1 mm. of mercury pressure. The mixture was then subjected to ultra-violet radiations from a quartz mercury light, the container being maintained at a temperature of about 25° C. The illumination was continued for a period of about 35 minutes during which time liquid particles settled out on the walls of the container so that the reaction was of the liquid-vapor two-phase type. An analysis of the reaction product showed that about 90% of the isobutylene was hydrobrominated. The yield of isobutyl bromide, i. e. product of abnormal addition, was equal to about 86%.

*Example II*

A gas phase hydrobromination reaction was effected by introducing pure isobutylene into a 3-liter container which was first subjected to a high vacuum to remove substantially all of the gases therefrom. The isobutylene gas was introduced until the pressure in the container was equal to 51.4 mm. of mercury pressure, hydrogen bromide being then introduced until the pressure rose to about 102 mm. of mercury pressure. The reactants were then subjected at a temperature of about 25° C. to ultra-violet radiation from a quartz mercury lamp, the reaction being continued for a period of about 70 minutes. An analysis of the reaction mixture at the end of this period of time showed a conversion of 87%, approximately 91% of the reaction product being isobutyl bromide.

*Example III*

In order to prove that the ultra-violet radiation accelerates hydrobromination and promotes abnormal addition, isobutylene and hydrogen bromide were introduced into a 3-liter bulb in quantities substantially similar to those employed in Example I. The mixture was allowed to stand for a period of about 65 hours in substantially complete darkness. An analysis of the reaction product showed that only about 70% of the isobutylene was hydrobrominated, 92.5% of this reaction product consisting of tertiary butyl bromide, i. e. a product obtained by hydrobromination according to the Markownikoff rule.

A comparison of the above experiments shows that ultra-violet radiations promote abnormal addition of hydrogen bromide, and, at the same time, greatly increase the rate of hydrobromination. In this connection it must be noted that the catalyzing effect of ultra-violet rays is considerably greater than that of the various previously known catalysts, such as peroxides, which promote abnormal hydrohalogenation. Also, these rays promote the abnormal addition even when the photo-chemical reaction is effected in a purely gas phase.

*Example IV*

A 500 cc. bulb, which was subjected to a high vacuum, was employed in this experiment. Butene-1 was introduced thereinto until the pressure rose to about 101.3 mm. of mercury pressure, after which hydrogen bromide was added until the pressure in the vessel was equal to about 200.3 mm. of mercury pressure. The reactants in the container were then subjected to ultra-violet radiations at a temperature of about 25° C. and for a period of time equal to about 112 minutes. Substantially all of the butene-1 was hydrobrominated, the reaction product having an index of refraction $n^{20}_D$ equal to 1.4393, indicating that the yield of normal butyl bromide was about 92%.

*Example V*

Vinyl chloride and hydrogen bromide were introduced into a completely evacuated container in quantities equal to 102.9 and 102.1 mm. of mercury pressure. The mixture was then subjected for a period of about ten hours to ultra-violet radiations from a quartz mercury lamp, the reactants being maintained at a temperature of about 28.5° C. Approximately 70% of the vinyl chloride was hydrobrominated, approximately 97% of which was 1-chlor-2-brom-ethane obtained via abnormal addition.

*Example VI*

In this test propylene and hydrogen bromide, in quantities substantially similar to those employed in the preceding example, were subjected to the action of ultra-violet radiations at a temperature of about 25° C. and for a period of about 109 minutes. The conversion was equal to about 90%, this reaction product being substantially pure normal propyl bromide, i. e. a product obtained by hydrobromination, contrary to the Markownikoff rule.

*Example VII*

Propylene and hydrogen bromide, which were carefully degassed and distilled in a vacuum system, were introduced into a reactor in a liquid state and at a temperature of about −78° C., approximately 0.6 mol of propylene and 0.3 mol of hydrogen bromide being employed for this experiment. This liquid mixture was then illuminated with a mercury arc lamp for approximately one minute. The reaction mixture was then washed with water and a potassium carbonate solution, and then dried with calcium chloride. The reaction product thus obtained had a refractive index $n^{20}_D$ equal to 1.4340, indicating that it was substantially pure normal propyl bromide.

*Example VIII*

Substantially pure and degassed propylene was introduced into a completely evacuated quartz bulb until the pressure therein was equal to about 102.9 mm. of mercury pressure, after which hydrogen bromide was conveyed into the same reactor for an additional 99.8 mm. of mercury pressure. The quartz vessel was then shielded by Pyrex glass and subjected to ultra-violet radiations from a mercury arc lamp for a period of about 2¼ hours. The pressure in the reactor decreased only about 4.7 mm. of mercury, indicating that only a small amount of reaction occurred. Thereafter the Pyrex shield was removed and, upon continuing illumination with the mercury arc lamp, substantially instantaneous hydrobromination was noticed. For example, at the end of three minutes the pressure decreased 80 mm. of mercury and the reaction was substantially complete in ten minutes. The reaction product showed that substantially only normal propyl bromide was obtained.

Similar reactions were conducted with mixtures of propylene and hydrogen to which small amounts of oxygen were added. It was noticed that, whereas substantially no reaction occurred when the reactants were maintained in the dark, the subjection of such mixtures to ultra-violet radiations, and particularly to those radiations having wave lengths of around 2900 Angstrom units, caused rapid hydrobromination to produce normal propyl bromide.

Although the above experiments were conducted with hydrogen bromide, it is to be understood that the invention is applicable to abnormal addition of other hydrogen halides, such as hydrogen chloride, hydrogen iodide, and/or hydrogen fluoride. However, the invention finds particular applicability to reactions involving hydrogen bromide and the unsaturated organic compounds of the class described hereinabove. Also, although it was shown that quartz containers were employed to transmit the effective ultra-violet radiations, or that containers with quartz windows may be used for the same purpose, it is to be understood that the containers may be made of or provided with windows of other substances, such as calcium fluoride, etc., capable of transmitting the effective rays of the ultra-violet band.

We claim as our invention:

1. In a proces of reacting propylene with hydrogen bromide wherein the reaction would ordinarily occur via normal addition to produce predominantly isopropyl bromide, the improvement which comprises directionally controlling the reaction to produce predominantly n-propyl bromide by subjecting the hydrogen bromide and propylene, in the vapor state, to the action of ultra-violet radiations of below 3000 Angstrom units.

2. In a process of reacting propylene with hydrogen bromide wherein the reaction would ordinarily occur via normal addition to produce predominantly isopropyl bromide, the improvement which comprises directionally controlling the reaction to produce predominantly n-propyl bromide by subjecting the reactants to the deliberate action of ultra-violet radiations of below 3000 Angstrom units.

3. In a process of effecting the addition of hydrogen bromide to terminally-unsaturated aliphatic hydrocarbons wherein the reaction would ordinarily produce compounds in which the bromine atom is attached to the beta carbon atom, the improvement which comprises directionally controlling the reaction to produce predominantly compounds in which the bromine atom is attached to the alpha carbon atom by subjecting a mixture of hydrogen bromide and of a terminally-unsaturated aliphatic hydrocarbon to the action of light rays having wave lengths of below 3000 Angstrom units.

4. In a process of hydrohalogenating an organic terminally-unsaturated compound wherein the reaction would ordinarily occur via normal addition to produce predominantly compounds in which the halogen atom of the hydrogen halide adds predominantly to the carbon atom in the beta position, the improvement which comprises directionally controlling the reaction to produce predominantly alpha-halogenated compounds by subjecting the reactants to the deliberate action of ultra-violet radiations of below 3000 Angstrom units.

5. In a process of effecting the addition of a hydrogen halide to an aliphatic hydrocarbon containing a terminal olefinic linkage, wherein the reaction would ordinarily occur according to the Markownikoff rule to produce beta-halogenated compounds, the improvement which comprises promoting and directionally controlling the addition reaction to produce predominantly alpha-halogenated compounds by subjecting the reactants to the deliberate influence of ultra-violet radiations of below 3000 Angstrom units.

6. In a process of effecting hydrohalogenation wherein the reaction would normally occur in accordance with the Markownikoff rule, the improvement which comprises directionally controlling the reaction to effect the addition of a hydrogen halide contrary to the Markownikoff rule, said directional control being effected by subjecting a hydrogen halide and a compound selected from the group consisting of unsaturated hydrocarbons containing at least one olefinic linkage in asymmetrical position in the molecule, their halo-substituted derivatives, and symmetrically unsaturated aliphatic and alicyclic hydrocarbons containing a halogen atom directly attached to only one of the unsaturated carbon atoms, to the deliberate influence of light rays having wave-lengths of below 3000 Angstrom units.

7. In a process of reacting an unsymmetrical unsaturated organic compound with hydrogen bromide wherein the reaction would ordinarily occur via normal addition, the improvement which comprises promoting and directionally controlling the reaction to effect abnormal hydrobromination by subjecting the reactants to the deliberate action of ultra-violet radiations of below 3000 Angstrom units.

8. The process according to claim 5, wherein hydrogen bromide is reacted with the alpha-unsaturated aliphatic hydrocarbon.

9. A process for the production of normal butyl bromide which comprises reacting butene-1 with hydrogen bromide while subjecting the reactants to the action of ultra-violet radiations of below 3000 Angstrom units.

10. A process for the production of a primary butyl bromide which comprises reacting a butylene which contains a terminal olefinic linkage with hydrogen bromide while subjecting the reactants to the action of ultra-violet radiations of below 3000 Angstrom units.

WILLIAM E. VAUGHAN.
FREDERICK F. RUST.